United States Patent [19]

Seaborne et al.

[11] Patent Number: 4,874,618
[45] Date of Patent: * Oct. 17, 1989

[54] PACKAGE CONTAINING A MOISTURE RESISTANT EDIBLE INTERNAL BARRIER

[75] Inventors: Jonathan Seaborne, Corcoran; David C. Egbert, Plymouth, both of Minn.

[73] Assignee: General Mills, Inc., Minneapolis, Minn.

[*] Notice: The portion of the term of this patent subsequent to Apr. 28, 2004 has been disclaimed.

[21] Appl. No.: 117,442

[22] Filed: Nov. 3, 1987

Related U.S. Application Data

[63] Continuation of Ser. No. 813,889, Dec. 27, 1985, abandoned.

[51] Int. Cl.$^4$ .................... A21D 15/08; A23C 19/14; A23G 3/00; B65D 81/34; B65D 25/08
[52] U.S. Cl. .......................................... 426/76; 426/89; 426/90; 426/92; 426/93; 426/94; 426/103; 426/106; 426/107; 426/95; 426/115
[58] Field of Search .................... 426/93–95, 426/76, 112, 100, 101, 113, 106, 90, 91, 89, 138, 120, 86, 234, 107, 390, 391, 115, 114, 243, 241, 139, 103, 89, 272–275, 279, 282, 392, 395, 810, 811, 415; 106/200, 218, 219; 427/2, 372.2; 424/33, 34, 92, 101, 102, 103; 260/97; 527/600–602, 604

[56] References Cited

U.S. PATENT DOCUMENTS

| | | | |
|---|---|---|---|
| 1,484,016 | 2/1924 | Fisher | 426/138 |
| 1,509,194 | 9/1924 | Dresser | 426/76 |
| 1,511,878 | 10/1924 | Gargay | 426/95 |
| 1,529,670 | 3/1925 | Pritchard et al. | 426/94 |
| 1,715,857 | 6/1929 | Meyer | 426/138 |
| 1,810,453 | 6/1931 | Webster et al. | 426/104 |
| 2,077,595 | 4/1937 | Swiss | 426/115 |
| 2,135,808 | 11/1938 | Friedman | 426/95 |
| 2,167,353 | 7/1939 | Frediani | 426/95 |
| 2,200,977 | 5/1940 | Baxter . | |
| 2,448,320 | 8/1948 | McIntosh | 106/218 |
| 2,600,566 | 6/1952 | Moffett | 426/234 |
| 2,714,070 | 7/1955 | Welch | 426/101 |
| 2,759,826 | 8/1956 | Lindsey | 426/95 |
| 2,759,830 | 8/1956 | Touceda . | |
| 2,811,453 | 10/1957 | Childs . | |
| 2,816,061 | 12/1957 | Doerr et al. . | |
| 2,909,434 | 10/1959 | Patten et al. . | |
| 2,951,763 | 9/1960 | Kelly et al. . | |
| 3,042,532 | 7/1962 | Daline | 426/132 |
| 3,043,747 | 7/1962 | Long . | |
| 3,141,778 | 7/1964 | Thompson et al. . | |
| 3,145,111 | 8/1964 | Norton . | |
| 3,157,518 | 11/1964 | Battista . | |
| 3,170,568 | 2/1965 | Carter . | |
| 3,186,850 | 6/1965 | Anthony | 426/86 |

(List continued on next page.)

FOREIGN PATENT DOCUMENTS

| | | | |
|---|---|---|---|
| 2612515 | 10/1977 | Fed. Rep. of Germany | 426/86 |
| 47-6435 | 2/1972 | Japan | 426/138 |
| 555977 | 9/1943 | United Kingdom | 426/115 |
| 942539 | 11/1963 | United Kingdom . | |

OTHER PUBLICATIONS

"Dictionary of Food Ingredients" by Robert S. Igoe, Van Nostrand, Reinhold Co., 1983, pp. 69–70.

Primary Examiner—Steven Weinstein
Attorney, Agent, or Firm—John A. O'Toole

[57] ABSTRACT

Disclosed are two-compartment food packages which includes a first lower compartment housing a first food material, e.g., ice cream, and a second upper compartment housing a second food material, e.g., chocolate sauce with the second material being supported on an edible barrier which also serves to define the upper and lower compartments. Preferred embodiments are especially adapted to packaged food items intended to be heated with microwave energy and further include a microwave shield surrounding the exterior wall surface of the lower compartment.

29 Claims, 3 Drawing Sheets

U.S. PATENT DOCUMENTS

| | | | |
|---|---|---|---|
| 3,228,776 | 1/1966 | Savage et al. | 426/114 |
| 3,248,232 | 4/1966 | Krajewski . | |
| 3,267,059 | 8/1966 | Cockeram | 527/601 |
| 3,275,448 | 9/1966 | Sommer | 426/120 |
| 3,323,922 | 6/1967 | Durst . | |
| 3,382,078 | 5/1968 | Melio et al. . | |
| 3,390,049 | 6/1968 | Rednick et al. . | |
| 3,471,303 | 10/1969 | Hamdy et al. . | |
| 3,560,222 | 2/1971 | Delaney . | |
| 3,576,663 | 4/1971 | Signorino et al. . | |
| 3,607,308 | 9/1971 | Dubble | 426/104 |
| 3,741,795 | 6/1973 | Signorino | 426/93 |
| 3,743,520 | 7/1973 | Croner . | |
| 3,796,813 | 3/1974 | Kurland | 426/132 |
| 3,851,571 | 12/1974 | Nichols | 426/112 |
| 4,039,435 | 8/1977 | Narva | 426/86 |
| 4,061,782 | 12/1977 | Baxter | 426/86 |
| 4,133,896 | 1/1979 | Standing et al. . | |
| 4,166,208 | 8/1979 | Martel et al. | 426/243 |
| 4,205,091 | 5/1980 | Van Horne | 426/139 |
| 4,221,291 | 9/1980 | Hunt | 426/115 |
| 4,233,325 | 11/1980 | Slangan et al. | 426/120 |
| 4,390,553 | 6/1983 | Rubenstein | 426/138 |
| 4,472,440 | 9/1984 | Bank | 426/76 |
| 4,596,713 | 6/1986 | Burdette | 426/120 |
| 4,603,051 | 7/1986 | Rubenstein | 426/138 |
| 4,661,359 | 4/1987 | Seaborne et al. | 426/92 |
| 4,710,228 | 12/1987 | Seaborne et al. | 426/89 |

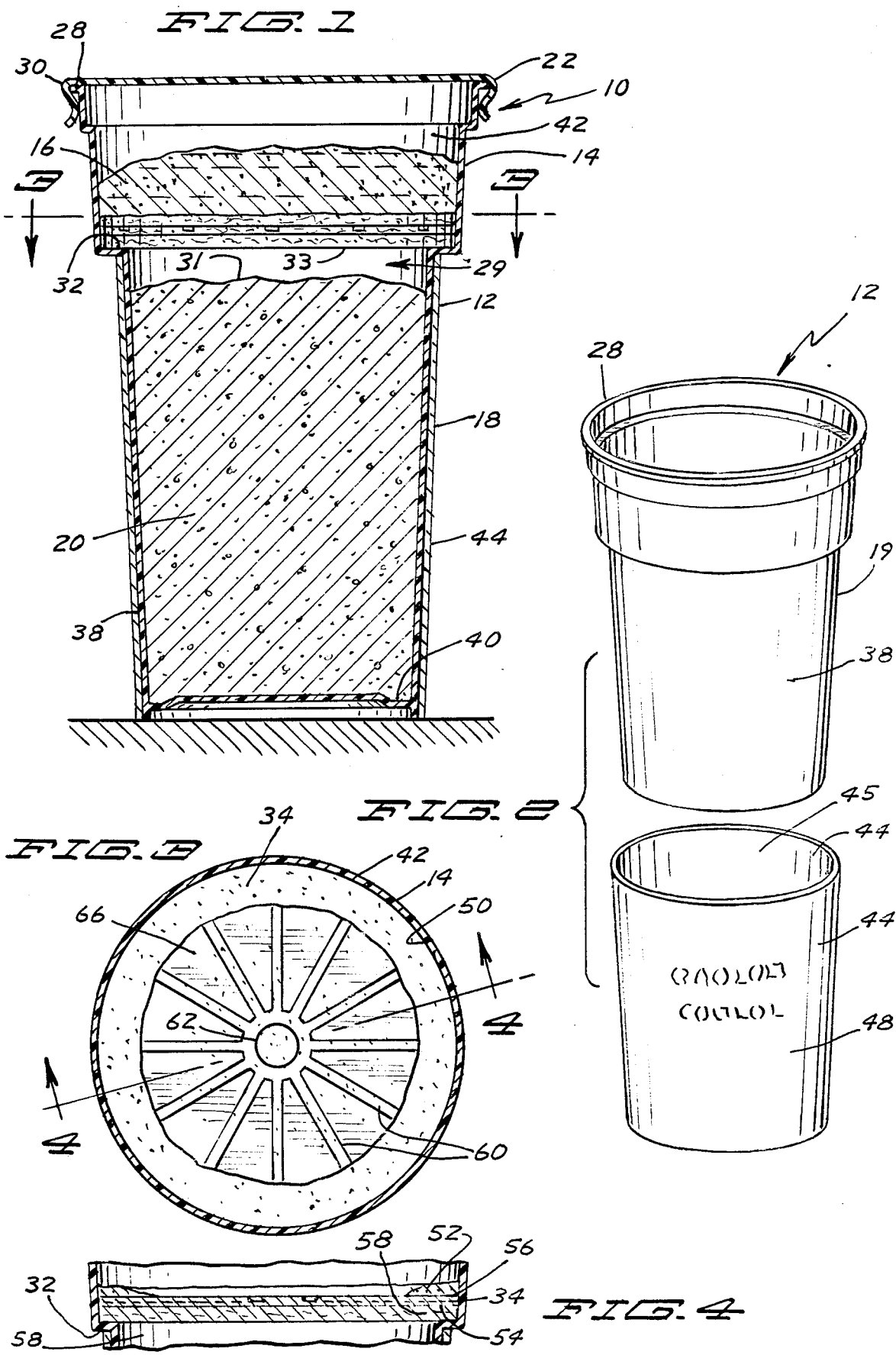

PACKAGE CONTAINING A MOISTURE RESISTANT EDIBLE INTERNAL BARRIER

This is a continuation of U.S. patent application Ser. No. 813,889, filed December 27, 1985 entitled Package Containing a Moisture Resistant Edible Barrier by Jonathan Seaborne and David C. Egberg now abandoned.

BACKGROUND OF THE INVENTION

1. The Technical Field

The present invention relates to food products. More particularly, the present invention relates to packaged or wrapped food products. Preferred embodiments comprise products adapted to be prepared with microwave heating.

2. The Prior Art

At present, at least two significant consumer trends influence consumer preference for food products. Consumers increasingly are eating more either away from home or even if at home, away from traditional, sit down full course dinners. Rather, consumers are eating more and more "on the run" whether at home or in work or pleasure activities. The second trend is for consumer preference for food products perceived as being more nutritious than conventional snack items.

Due to these two trends, convenience, snack and novelty food items are enjoying greatly increased consumer popularity. Especially desirable are food products which combine more than one type of food so as to provide an interesting blend or contrast of flavor, texture, temperature and the like. By way of example, frozen novelty items such as cookies and ice cream frozen novelties have become quite popular.

The prior art, of course, includes numerous examples of inedible barriers in the form of laminates having moisture impermeable coating (see, for example, P. H. Carter U.S. Pat. No. 3,170,568 issued Feb. 23, 1965). Also known are edible containers having an inedible internal moisture barrier (see, H. M. Bank U.S. Pat. No. 4,472,440 issued Sep. 18, 1984. Rubenstein et al U.S. Pat. No. 4,390,553 (issued June 28, 1983) discloses an edible food container with a fat coating of its inner surface.

The prior art has included a number of packaging developments to provide two compartment packages to separate dissimilar components until admixture immediately prior to consumption. In particular, Slangan et al U.S. Pat. No. 4,233,325 (issued November 11, 1980) discloses a two compartment package comprising a first lower compartment and a second upper compartment. More specifically, the '325 discloses an ice cream package including a compartment for heating syrup. There the upper compartment may be either an integral part of the food package or may be a separate container that is removably fitted within the upper portion of the first lower compartment. One disclosed embodiment describes a pierceable inedible barrier between the upper and lower compartments which after creation of an orifice therein allows for admixture of the two food components previously separated. However, the barrier between the syrup and the ice cream is not edible. Thus, the package compartment housing the syrup must be removed entirely and the syrup poured onto the ice cream in the lower compartment. It is possible to make the supporting member of the compartment pierceable or tearable allowing for penetration thereof by, for example, a spoon, the contents of the upper container could then be allowed to fall or drain into the lower compartment. However, such construction suffers from several disadvantages. First, there is a trade-off between support strength of the barrier and the pierceability of the barrier. Second, for barriers which are more readily pierceable, fragments of the barrier material can be intermixed with the food. Not only is such admixture aesthetically unpleasant but consumption of the pieces of ruptured membrane material could possibly result in serious health problems.

The present invention provides a substantial improvement over the package disclosed in the '325 patent in the respect that the present food packages comprise a superior and an edible barrier which serves both to define, in part, the two compartments and to separate the two foods. By utilization of an edible barrier both the aesthetic and safety disadvantages of the '325 packages are avoided. Additionally, the package construction is simplified which results in a cup of reduced cost.

Another two compartment package with an edible barrier to separate dissimilar components is disclosed in A. E. Welch U.S. Pat. No. 2,714,070 (issued July 26, 1955) where an ice cream cake or cone body is used to separate an upper sauce component from a lower ice cream component in a microwaveable cup. However, such barriers have been found ineffective to prevent moisture migration between the two components over extended storage times even though simple physical separation of the components may be achieved. Also, the ice cream cone material loses its desirable crispness over time due to the moisture migration and becomes extremely tough thereby difficult to penetrate or to consume.

BRIEF DESCRTIPTION OF THE DRAWINGS

FIG. 1 is a cut-away side elevational view of a food package divided into two compartments by the edible barrier and separating a first food from a second food;

FIG. 2 is an exploded, perspective view of the package body piece with a microwave shield detached;

FIG. 3 is a top cross-sectional view taken along lines 3—3 of FIG. 1 showing one embodiment of an edible barrier with the top compound fat layer partially cut away to reveal a designed fracture wafer;

FIG. 4 is a cross-sectional view taken along lines 4—4 of FIG. 3 showing the several layers comprising the present edible barrier;

DESCRIPTION OF THE PREFERRED EMBODIMENTS

Figure 5:
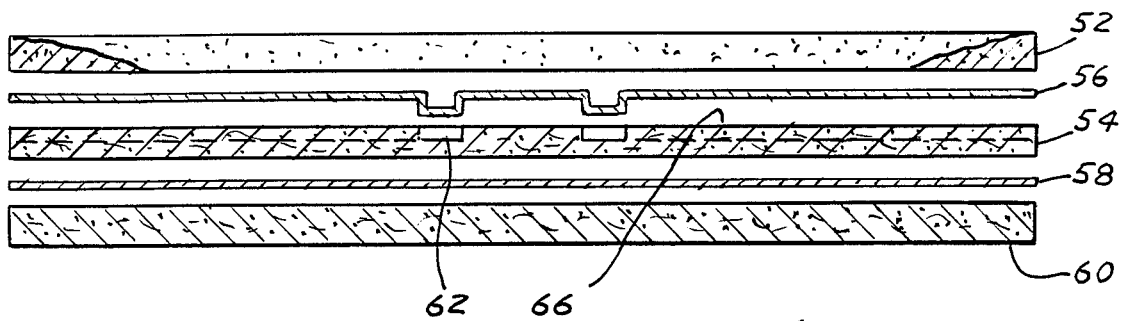
FIG. 5 is an exploded, greatly enlarged cross-sectional view comparable to that shown in FIG. 4.

Throughout the specification and claims, percentages are by weight and temperature in degrees Fahrenheit unless otherwise indicated.

Referring now to the drawings, and to FIG. 1 in particular, there is shown an embodiment of the present package composite food article which is designated generally by reference numeral 10. As can be seen, the food article 10 includes a two compartment package 12 of the present invention comprising a container or cup which has an upper or first compartment 14 holding a first food material component 16 and a second or lower compartment 18 holding a second food material 20.

The first food may be any manner of wet or dry food, e.g., yogurt, soup, ice cream, or cake whether frozen or liquid or whether homogenous, e.g., pudding, or in discrete pieces, e.g., Ready-To-Eat cereal. Typically, the lower food portion should be the higher weight fraction of the total food, or the more dense food phase so as to give the article 10 stability from tipping over. The upper or first food 16 will differ from the lower or second food 20 in some compositional aspect such as acidity, water activity, or soluble color, protein, oil and/or oxygen concentration. By virtue of such differences, a gradient would be established where the food phases have been in physical contact with each other which gradient would lead to migration between the two foods or to reaction therebetween causing undesirable interaction.

Still referring to FIG. 1, it can be seen that covering compartment 14 is a cover or lid 22 which is microwave transparent and which is removably attached to the container 12. This cover 22 can be fabricated from any heat-resistant flexible material which will permit the passage of microwave energy therethrough, but which will not melt or fuse to the walls of the package as a result of the passage therethrough of microwave energy. Upper compartment 14 has an orifice and a peripheral rim or bead 28 thereabout. The lid 22 can be secured to the upper compartment 14 by conventional means such as crimping 30 of the lid 22 about bead 28 or with adhesive means.

As further seen in FIG. 1, the cup 13 further includes a shoulder 32 which serves in part to define the upper compartment 14 and the lower compartment 18 as well as to provide support for a barrier 34 which is further described below. The cup 13 can be conveniently fabricated from a single mold from materials such as polyethylene, polyvinyl chloride, polypropylene, polystyrene, or other clear or opaque materials or in several pieces from conventional cellulosic or other microwave transparent packaging materials. Cup 13 further includes a lower compartment wall 38, a bottom 40 and an upper body wall 42. The embodiment depicted is especially adapted to house foods intended to be heated with microwave energy, and thus package 12 additionally includes a microwave shield 44 substantially surrounding the lower compartment 18. The skilled artisan will appreciate, however, especially from several of the examples herein, that certain embodiments of the microwave package do not require a microwave shield and other embodiments are desirably free of microwave shielding.

It can also be seen that there is an air space 29 intermediate the top surface 31 of the lower food phase 20 and the bottom surface 33 of the barrier 34. FIG. 1 shows that the shield 44 extends downwardly from shoulder 32 and thus importantly over the air space 29 to about bottom 40. Such an air space 29 is of critical importance for microwave application to insure proper heating of the upper food phase even in the absence of the microwave shield 44. Surprisingly, it has been found that when the barrier is in direct contact with the lower food phase 20, the lower food phase 20 acts as a heat sink preventing the upper food phase 16 from heating properly. Also, the lower food phase undesirably heats adversely affecting desired organoleptic properties. The air space should be at least 1 mm, preferably at least 3 mm in thickness.

Reference is now made to FIG. 2., where it can be seen that the microwave shield 44 can be fabricated as a sleeve into which a cup 19 snuggly fits and adhesive applied to the inside surface 45 of the shield 44 can be used to additionally secure the sleeve shield 44 to the cup 19. The shield can be fabricated from any conventional shielding material. Conveniently, the shield 44 can be fabricated as a laminate including an inner layer of aluminum foil 47 and an outer support layer 48 such as cardboard, which can additionally function to bear external packaging graphics and print information. The skilled artisan will also appreciate that while the drawings depict packages wherein the microwave shield 44 shields the lower compartment 18, that other embodiments of the present invention can readily be fabricated with the shielding surrounding the upper compartment 14.

Reference now is made to FIG. 3, which shows an embodiment of the present edible barrier 34. It can be seen that the edible barrier 34 can be generally circular in construction and is intended to substantially completely fill the inner diameter 50 of the upper compartment 14. The barrier 34 comprises an upper first layer of edible fat 52. The fat layer can cover the entire major surface of the barrier 34 or merely the exterior perimeter of the barrier such as to comprise a means for securing the barrier in place.

Reference is now made to FIGS. 4 and 5 which depict the laminate construction of the present edible barriers 34. The barrier 34 generally includes a support substrate 54. Typically, the substrate 54 is in a generally planar or is sheet-like in form. The substrate can be formed of any edible material providing modest structural support and coherency to support the upper food layer (not shown) in providing a relatively smooth surface.

Exemplary materials useful herein as the substrate 54 include cookies, providing such cookies have a smooth surface whether hard or soft, i.e., continuous and without open surface cells or pores. The desirability to have a smooth surface as opposed to an open cell or rough surface, e.g., cut-layer cake surface, involves the support of finding a surface that is sufficiently smooth and to which an even, break-free film or sealant layer (described below) can be applied. Also useful herein are the well known baked sugar wafers such as used in conventional ice cream cones. (See, for example, W. W. Turnbull U.S. Pat. No. 1,876,105 issued September 6, 1932 and L. A. Marinelli U.S. Pat. No. 1,498,464 issued June 17, 1924).

Also useful herein as the substrate 54 are discs or bars prepared from compressed cereal fines or from nut meats or powders. Such bars are prepared by merely compressing (e.g., greater than 10,000 psi; 0.70–2.11×10$^3$ kg/cm$^2$) particulates with or without excipients with a pelletizing agent or sugars such as is marketed under the trade name CANTAB by Penick and Ford, Ltd., Cedar Rapids, Iowa, and/or other fillers and/or magnesium stearate, fats and/or oils and other binding or lubricant agents.

Exemplary concentration ranges are given below:

| Compression Discs Formulation Ranges | | |
|---|---|---|
| Range % | Preferred | Ingredients |
| 0–65 | 45–65 | cereal, cookies (granular, powder) |
| 25–50 | 28–50 | tableting sugar |
| 0–6 | 1–6 | calcium and/or magnesium stearate |
| 0–6 | 1–3 | hydroxypropyl cellulose |
| 0–6 | 0.3–3 | acetylated monoglycerides |
| 0–10 | 3–10 | coconut oil |
| 0–100 | 60–100 | nuts meats (whole, pieces, etc.) |
| 0–15 | 5–15 | partially hydrogenated vegetable oils (soybean, cottonseed, etc.) |

The supports typically are lower in moisture content, e.g., less than 10%, typical of wafers, crackers, or biscuits. Both heat tolerant and heat sensitive materials can be employed herein in preparing the substrates or supports. Other useful support material include chocolate, cheese, compounded fat systems, wheat germ, synthetic nuts, peanut brittle, thin candy bars, crystallized sugars and compound coatings. Highly preferred materials either remain crunchy or tend to soften only slightly upon aging. Less desirable materials like the sugar or baked wafers tend to toughen upon aging. Further details concerning the edible barriers used herein can be found in USSN 803,358, filed December 2, 1985 entitled EDIBLE BARRIER FOR COMPOSITE FOOD ARTICLES, by Jonathan Seaborne, and David C. Egberg and which is incorporated herein by reference.

In the most preferred embodiments, the edible barriers 34 essentially additionally comprise both an upper or overlaying layer 56 and/or a lower or underlying layer 58 of an edible film material of low moisture permeability. If in less preferred embodiments only a single edible film layer is employed, the film layer preferably faces the food phase having the higher water activity. It is important that the film material provide continuous, flexible, moisture impermeable, non-water swelling films. Any edible food film composition providing the above attributes can be used herein, e.g., conventional shellac. Especially suitable compositions, composition preparation and application techniques for use as the film layers are disclosed in Seaborne et al U.S. Pat. No. 4,661,359, issued April 28, 1987, entitled EDIBLE COATING COMPOSITIONS COMPRISING ACID CATALYZED SHELLAC AND HYROXYPROPYL CELLULOSE AND METHOD OF PREPARATION, and U.S. Pat. Ser. No. 788,178, filed October 16, 1985, now Seaborne et al U.S. No. 4,710,228, entitled EDIBLE COATING COMPOSITION AND METHOD OF PREPARATION, each of which are incorporated herein by reference. The coatings there described in detail are polymers of a specially defined, heat cured shellac or copolymers of the shellac with certain other reactants having a reactive acid or hydroxyl moiety.

Shellacs are commonly treated in various ways to modify its properties. Not all shellacs used in other food applications can be used in this preferred embodiment. It is essential to use only dewaxed, filtered, carbon black decolorized, non-chemically modified or "virgin" shellac. It has been surprisingly found that other refined or bleached shellacs do not possess the reactivity required to cross-link so as to be useful in the present invention. Suitable shellacs are available from commercial suppliers such as Kane International, Larchmont, New York.

In the most highly preferred embodiments, hydroxypropyl cellulose or ("HPC") is the second principal essential component employed in forming the present coating compositions. A closely related material, hydroxypropyl methyl cellulose ("HPMC") can be used in full or partial replacement for HPC. As little as 0.25% of the compositions of HPC has been found to be helpful in adding flexibility and moisture vapor permeability reduction to the shellac film and as much as 50% of HPC has been found to give good moisture vapor impermeability to the shellac film without losing the desirable sealing characteristics of the shellac film. Higher quantities of HPC can produce film which are more sensitive and moisture permeable. For better results, the HPC can comprise about 0.5 to 10% of the compositions.

HPC is a type of cellulose ether. The use of cellulose ethers in food coating compositions is well known. Cellulose ethers, by themselves, however, are generally considered to be unsuitable for coating in view of their brittleness or lack of resiliency, flexibility, and plasticity and, most importantly for some, water solubility. HPC and HPMC are highly water soluble and, undesirably, have a relatively high water permeability. A 2.00 mil film of pure hydroxypropyl cellulose will have a permeability of about $8.73 \times 10^{-7}$ cm$^3$ (STP) cm$^{-2}$ sec$^{-1}$ cmHg$^{-1}$ cm$^{-1}$ and hydroxypropyl methyl cellulose $2.24 \times 10^{-4}$ cm$^3$ (STP) cm$^{-2}$ sec$^{-1}$ cmHg$^{-1}$ cm. Plasticizers which have heretofore been employed in combination with the cellulose ethers are either of the non-edible type or, if edible, have detracted from the thermal stability and barrier properties of the cellulose ether. Additives are generally to be avoided for inclusion herein which have previously been suggested for cellulose ether coating compositions including glycerin, propylene glycol, polyoxyethylene compounds, glycerol monostearate acetylated monoglycerides of fatty acids or acylated fatty glycerides. Thus, preferred for use herein are those films which are substantially free (i.e., contain less than about 0.5% dry weight) of such materials.

The cellulose ethers employed in the coating composition of the present invention are edible cellulose ethers containing between 2.1 and 2.7 ether groups per glucose unit in the cellulose polymer chain. Published information suggests that the hydroxypropyl substituent groups contain almost entirely secondary hydroxyls and that most of the primary hydroxyl in the cellulose have been substituted. It is the secondary hydroxyls that are the reactive groups remaining. Typical molecular weights for the hydroxypropyl celluloses range from 60,000 to 1,000,000 and hydroxypropyl methyl celluloses 13,000–120,000.

Within the above given parameters, it is desirable to produce cross-linked shellac having a molecular weight ranging from about 2,000 to over 1,000,000 if HPC or HPMC is used in conjunction with the shellac.

USSN 788,178 indicates that the coating compositions essentially comprise a shellac, specially defined polymerized alone or in combination with certain edible reactant members having reactive hydroxyl or acid moieties.

The edible reactant member can be selected from the group consisting of edible sources of polyphenolics, edible sources of benzaldehyde and its derivatives, acetylated monoglycerides, polyglycerol esters, straight chain monocarboxylic acids, monoglycerides, diacetyl tartaric acid esters of monoglycerides and mixtures thereof. The ratio of shellac to reactant member essentially ranges from 1:0.001 to 1:1.5.

Within these reaction parameters, it is desired to produce cross-linked shellac or copolymer having a weight average molecular weight ($M_w$) ranging from about 1,500 to 6,000 as determined by gel permeation chromatography.

Generally, each film layer herein can range from about 0.1 to 5 mil in thickness, preferably 0.5 to 2.0 mil. The films 56 and 58 can be compositionally similar or different so long as the films provide the requisite low moisture impermeability and other properties.

It is another advantage of the present invention that the present packages include edible barriers which desirably maintain their original organoleptic attributes such as crispness over extended storage times. This advantage stems from the superior moisture or barrier protection afforded by the present barriers. Uncoated sugar cone barriers, for example, develop undesirable toughness with moisture absorption.

While good sealant barriers can be prepared employing upper and lower films 56 and 58 as described above, in certain highly preferred embodiments, the edible barriers 34 additionally comprise an edible fat sealant layer 60 in substitution for or in addition to the film layer(s). In the most preferred embodiment depicted in FIG. 5, the fat layer 60 is shown in addition to the lower coating 58. The edible fat layer can be based upon any edible fat or fat based composition, e.g., compound fats which are mixtures of fat and other food solids typically including sugars and can be the same or different from the composition of the fat sealant layer 52. Useful, for example herein, are chocolate, whether sweet or semi-sweet, milk or dark chocolate, compound fat, or dairy fat based. Such confectionery coatings are well known in the food art and the skilled artisan will have no problem selecting compositions useful herein. The fat layer(s) however, is preferably substantially moisture free, i.e., butter and margarine, having moisture contents of about 20%, while useful, are less preferred. The fat layer provides modest additional moisture permeabililty protection as well as organoleptic improvements. As shown in the drawing, the fat layer is typically substantially thicker than the film layers. Suitable fat layers can range from 0.25 to 10 mm and preferably about 1 to 5.0 mm. in thickness.

The foregoing description of edible barriers of the present invention contemplate edible barriers which are relatively uniform in thickness although possible with modest mounding when cookies are employed. While useful, such barriers when broken during consumption can break into random and unpredictable size and shape and often break only with difficulty. Indeed, traditional wafer designs, e.g. for ice cream cones, frequently employ raised ribbing to give the wafer added structural support and/or to resist breaking.

Referring now briefly back to FIG. 3 there is shown a highly preferred, "designed fracture" embodiment of substrate 54. A designed fracture substrate includes means for fracturing the substrate into pieces of controlled shape and/or size. As shown, the substrate 56 is in the form of a controlled disk or round sheet. The substrate is fabricated with a means for controlled fracturing of the substrate such as a plurality of radial grooves or score lines such as 60. The substrate can also be formed with one or more concentric ring grooves such as 62. Construction of substrates with such grooves or score lines provide for controlled and easy fracturing of the disk shaped substrate 56 into wedge shaped pieces of roughly similar size and shape.

Referring now again to FIG. 5, it can be seen that the grooves are relatively shallow. Preferably the grooves are in the top surface 66 of the substrate 28 so that the grooves are more discernable to the consumer so as to aid the controlled substrate 54. The grooves, of course, can be formed alternatively in the lower surface or in both surfaces.

It can be appreciated that in certain embodiments, the present article 10 will be intended for foods which are not intended to be heated with microwave heating or do not require microwave shielding when heated in a microwave. For example, in a food package comprising yogurt in the lower compartment and dried particulate material in the upper compartment, ready-to-eat cereal pieces, nuts, raisins, seasonings, etc., that such products are intended to be eaten at refrigerated temperatures. Accordingly, such packages do not require the microwave shielding 44 since such packages are not intended to be subjected 40 microwave heating. In still other applications, each food phase might be subjected to microwave heating without adverse effect, e.g., soup and crackers and thus require no microwave shielding.

Figure 6:
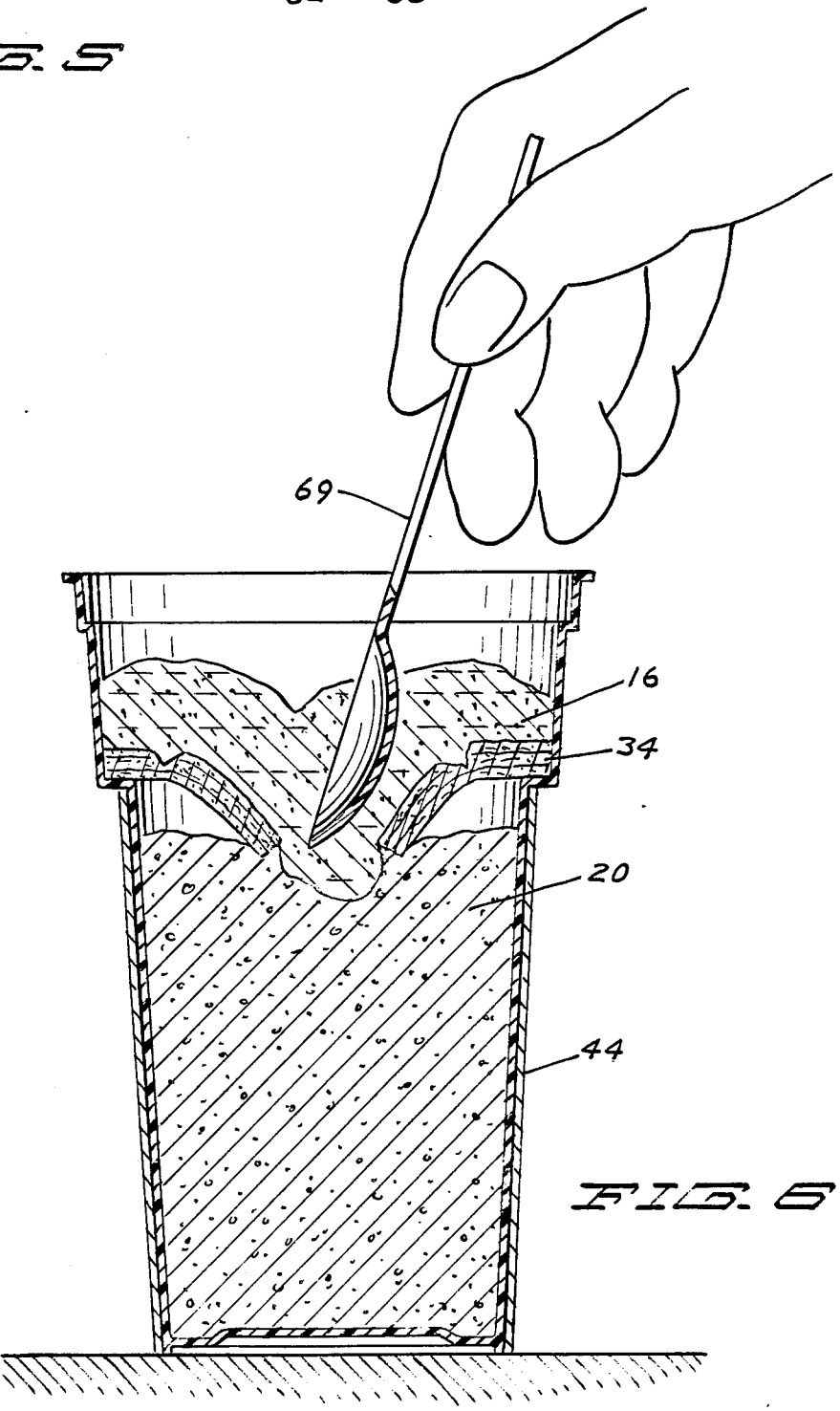
FIG. 6 is a cut-away elevational view of the food package of the present invention after removal from heating in a microwave oven and after rupturing or breaking the edible barrier so that the warmed first food from the upper compartment can be admixed with the food contained in the second compartment.

FIG. 6 depicts a typical utilization of the present food article 10. After microwave heating for an appropriate time, e.g., 30 seconds to 2 mintues, the lid 22 (not shown) is removed. A spoon or other utensil 69 is used to break or pierce the barrier 34 to form an orifice opening into the lower compartment. The utensil 69 is then used to spread or mix or otherwise combine the two food materials. By virtue of the present construction, the upper or first food material has been warmed by the application of the microwave heating. In contrast, the lower food material by virtue of the microwave shielding 44 is substantially cooler than the first food material.

Figure 7:
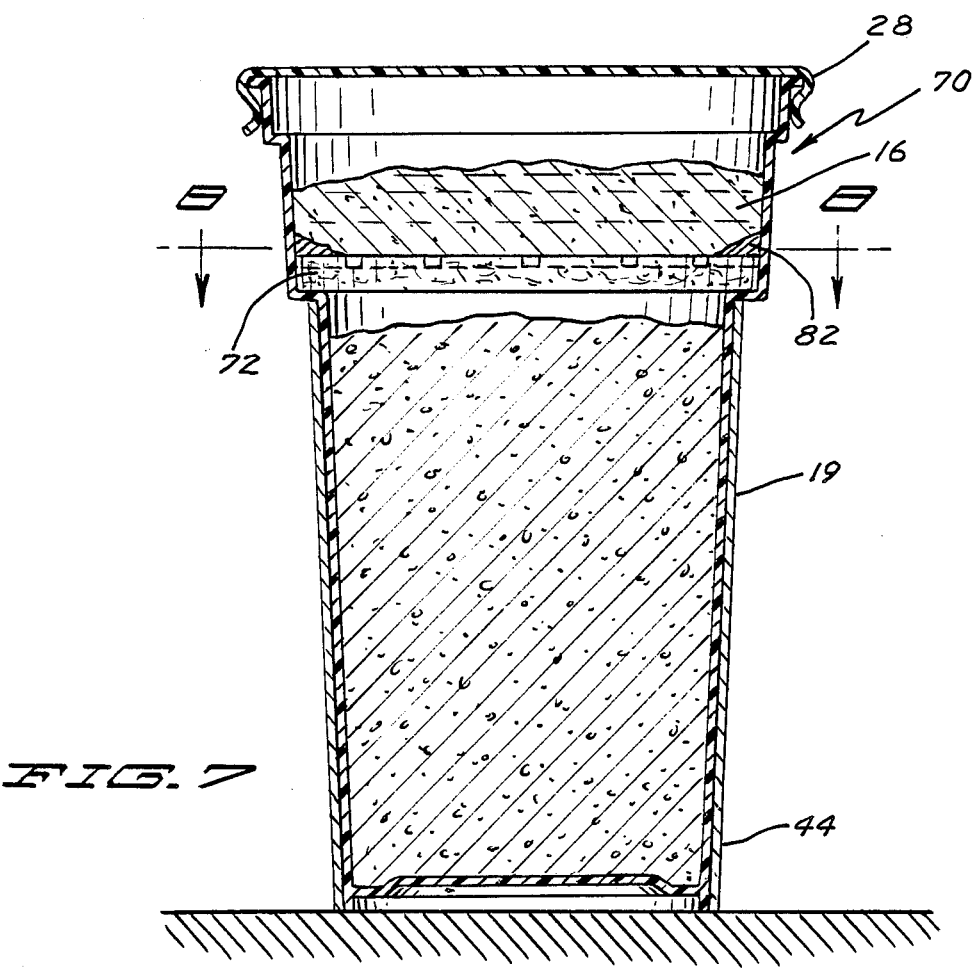
FIG. 7 is a cut-away elevational view of another embodiment of the present invention comprising a solid barrier.

Another embodiment of the present invention is depicted in FIG. 7 and is designated generally by reference numeral 70. This embodiment is substantially identical to the embodiment designated by reference numeral 10 differing only in that the article 70 includes an edible barrier 72 which is a solid phase as opposed to the previously described laminated barrier construction. For example, the solid edible barrier 72 can comprise a single fat layer comprising fat such as that previously described as those materials from which the fat layers 52 and 60 are comprised. Such barriers find particular suitability in microwave products and can readily be formulated and fabricated into barriers which melt or fluidize upon microwave heating. Upon such change in state, the barrier collapses upon the food phase in the lower compartment to combine with the upper food phase to form a warm topping.

An illustration of this embodiment which is intended to package an ice cream and syrup food system has an edible barrier which is comprised of a compound fat having a melting point ranging from 40° to 95° F., preferably about 65° to 78° F. (18° to 26° C.). Of course, during normal distribution at freezer temperatures, the barrier material is in the form of a solid even though it is paste-like at room temperature. In this embodiment, the edible barrier will heat upon microwave heating along with the upper food so that it reaches a fluid state. If the barrier is too thin then the barrier will melt completely too early and the upper food material will fall into the lower compartment before the end of the microwave heating is completed. If too thick, then the barrier will fail to melt entirely with the concomitant undesirable organoleptic effect. Accordingly, it is desirable that the fat based edible barriers range in thickness from about 0.5 to 5.0 mm. Exemplary meltable solid phase barrier components and concentrations are given below:

| Edible Barrier Compounded Formulations (Sweet and/or Savory) | | |
| --- | --- | --- |
| Range % | Preferred | Ingredients |
| 0–50 | 30–50 | sugar |
| 0–32 | 1–26 | non-fat dry milk |
| 0–13 | 4–12 | cocoa (natural and/or dutched) |
| 0–50 | 25–50 | cheese powders |
| 0–5 | 2–5 | lactose |
| 0–30 | 4–30 | maltodextrins |
| 0–13 | 5–13 | tapioca flour |
| 0–6 | 3–6 | pregelatinized starch |
| 0–5 | 1–5 | natural and/or artificial flavors |
| 0–0.40 | 0.2–0.4 | lecithin (regular and/or hydroxylated) |
| 0–60 | 4–33 | sunflower oil |
| 0–26 | 1–21 | coconut oil |
| 0–60 | 4–41 | palm kernel oil |
| 0–17 | 9–15 | corn oil |
| 0–17 | 8–15 | acetylated monoglycerides |
| 0–5 | 1–4 | diacetyl tartaric esters of monoglycerides (DATEMS) |
| 0–37 | 8–32 | partially hydrogenated vegetable oil (soybean, cottonseed, etc.) |

Also useful herein are conventional hard candy compositions. However, such compositions are less preferred especially when used at greater thicknesses.

Figure 8:
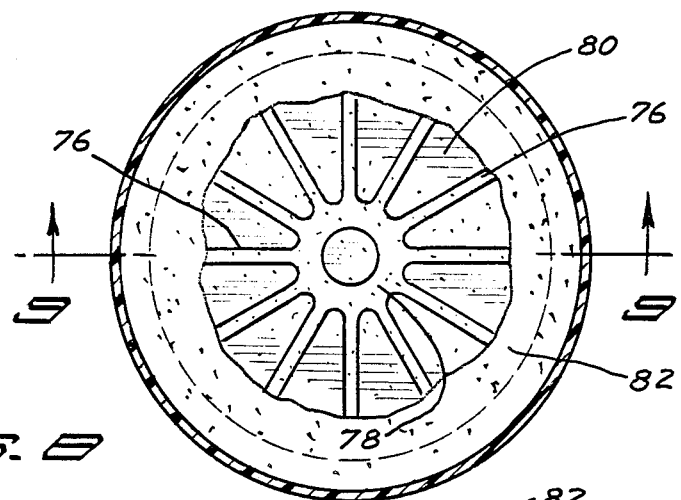
FIG. 8 is a top sectional view taken along lines 8—8 of FIG. 7.
Figure 9:
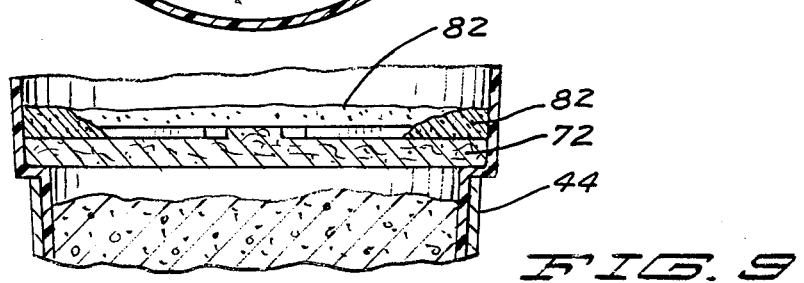
FIG. 9 is a cross-sectional view taken along lines 9—9 of FIG. 8.

Referring now to FIG. 8, the preferably solid edible barrier 72 can also preferably be provided with a means for controlled fracturing such as embossing the barrier 72 with a plurality of score lines such as radial score lines 76 and concentric ring grooves 78 in a major surface of the barrier 72 such as the top surface 80 as shown. The article 70 can also include means for securing the edible barrier 72 within the container 19 such as a peripheral fat ring 82 which is compositionally and functionally comparable to that described above. If desired, additional over or underlying shellac based layers can be added for added barrier efficacy.

The following examples are offered to further illustrate but not to limit the invention disclosed herein.

EXAMPLE 1

Fifteen grams of a mass of milk chocolate of current commercial grade (Blommer Chocolate Company, Inc.) was taken and cast into a disc of 69 mm (2.72 inches) diameter and 2.5 mm in thickness. Upon tempering and cooling at the appropriate conditions, the chocolate disc was coated on one side (1% by weight) using a commercial grade of confectioners glaze (shellac) and dried under a steady stream of cool air. A cup corresponding in shape substantially to the cup depicted in FIG. 1, but not having a microwave shield, was taken and in its lower compartment placed a mixture of Golden Grahams® RTE cereal (0.17 $A_w$) and miniature marshmallows so as to fill the lower compartment to within 0.125 inches of the upper compartment. The milk chocolate disc was then placed in the cup between the lower and upper compartment resting on the ledge with a glaze coated surface facing toward the upper compartment. The upper compartment was filled with 35 grams of a chocolate fudge sauce (0.86 $A_w$) of commercial grade and placed in a refrigerator at 36° F. (2° C.).

Upon equilibration to 36° F. (2° C.) the container was removed from the refrigerator and placed in a 700 watt microwave oven and heated on high for 25 seconds. Upon heating, the chocolate disc melted and the warm fudge sauce in the upper compartment collapsed over the cereal and the marshmallows in the lower compartment thereby producing a microwave "S'mores" type of snack.

EXAMPLE 1A

Same as 1 but frozen at 0° F. (−18° C.) overnight and heated for 40 seconds in the microwave.

EXAMPLE 1B

An article substantially similar to those described in both Examples 1 and 1A can be fabricated but using a commercially available vanilla flavored bark chocolate for the disc and using a white fudge sauce for the upper compartment and substituting with chocolate miniature marshamallows in the lower compartment with the Golden Graham® cereal.

EXAMPLE 2

A 249 gram mass of compound cheese coating with the formulation set forth below was taken and sheeted to a thickness of 2.5 mm. A controlled fracture pattern of ¼ inch squares was engraved into its surface 1 mm in depth as a means for controlled fracturing. Upon tempering and cooling, several 69 mm (2.72 inches) diameter discs were cut from the sheet using a die and coated (1% by weight) on the smooth side with a heat treated shellac glaze prepared as described below and dried under a steady stream of cool air.

A cup corresponding in shape substantially to the cup depicted in FIG. 1, but not having a microwave shield, was taken and into its lower compartment was placed 4 ounces (113.6 grams) of fresh small curd direct set cottage cheese (0.96 $A_w$). The formulated cheese disc was then placed in the container between the upper and lower compartment resting on the internal shoulder with the shellac treated surface on the bottom facing toward the lower compartment. The perimeter of the disc between the disc edge and the compartment side wall was sealed with an additional 2 grams of formulated cheese coating using a depositor and the container cooled to solidify the seal. Upon cooling to 36° F. (2° C.), 15 grams of commercial seasoned croutons (0.15 $A_w$) was placed into the upper compartment. The container was sealed and placed in a refrigerator at 86° F. (2° C.).

For consumption, the container is removed from the refrigerator and the cheese disc is broken into small pieces along the engraved indentures using a spoon or other similar utensil or instrument. Removal of the disc from the side of the container wall is aided by slight squeezing of the container concurrent with piercing the disc with the eating instrument. The resulting meal is a refrigerated salad of cottage cheese, croutons and artificial cheese pieces. Refrigerated shelf-life of product as described is limited to about 45–50 days due to cottage cheese life.

| Formulation Compound Cheese Coating | |
| --- | --- |
| 28.1% | Cheddar Cheese/Blue Cheese Powder (Kraft Inc.) |
| 19.2 | Refined palm kernel oil |
| 11.4 | acetylated monoglycerides |
| 11.4 | corn oil |
| 6.1 | coconut oil (76°) |
| 1.6 | non-fat dry milk |
| 4.0 | lactose |

| -continued | |
|---|---|
| Formulation Compound Cheese Coating | |
| 4.8 | maltodextrin |
| 8.2 | tapioca flour |
| 4.9 | Therm-Tex ™ Starch |
| 0.3 | lecithin |
| 100.0% | |

Preparation of Heat Modified Shellac 100 grams of dewaxed, carbon filtered shellac was placed in an oil jacketed heating vessel and heated to 140° C. Upon reaching temperature, the magma or molten mixture began to foam and the reaction was run for eight minutes with stirring. The magma was stiff and flowable with a final temperature of 150° C. The molten mixture was poured into 900 ml. of a 10:1 mixture of 95% ethanol and ethyl acetate with high shear mixing and upon solution was diluted to one liter. Subsequent coatings were placed on substrates using an airless sprayer equipped with a 0.4 mm nozzle orifice.

EXAMPLE 2A

Similar to Example 2 except that the cheese disc is comprised of the following. A cheese slice (regular or processed) is coated on one side with a 1.0 mm coating of the above formulated cheese coating and engraved as previously described to a depth of 0.75 mm. A subsequent shellac confectionery glaze as also described is coated on the real cheese slice and dried. The laminated cheese disc is then placed in the container with the glazed surface facing toward the lower compartment or high moisture side and sealed as described in Example 2.

EXAMPLE 2B

An article substantially similar to that described in Example 2 can be fabricated except that the edible disc is comprised of a baked biscuit, e.g., a Zwiebach ® biscuit. The biscuit is engraved or baked with a controlled fracture pattern and is coated with a confectioners glaze and dried in a stream of warm air. The biscuit is then coated with a formulated cheese coating as described in Example 2A. The laminated barrier is then placed in the container with the cheese coating oriented toward the lower compartment or high moisture side and sealed as outlined in Example 2.

EXAMPLE 2C

A less preferred variation of the article of Example 2B can be fabricated employing an unscored or unengraved biscuit and not having a confectionery glaze coating with all other items being similar.

EXAMPLE 3

A conventional sugar wafer formulation was prepared as described below and baked on a flat sugar wafer press at 350° F. for 3 minutes. The baking plate was fashioned in such a manner so as to produce an engraved pattern on one side of the sugar wafer to aid in a controlled fracture when broken. The wafer sheet stock was cut into 69 mm (2.72 inches) diameter discs so as to fit into an available container. Other sizes were also produced ranging from 50–80 mm (1.97–3.15 inches) in diameter.

The wafer discs were coated on both surfaces using the confectionery glaze prepared in Example 2. Final coating weight was 2% total (1% each surface) and air dried.

A cup corresponding in shape substantially to the cup depicted in FIG. 1, but not having a microwave shield, was taken and in its lower compartment placed 4.5 ounces (127.8 grams) of commercially available chocolate pudding (0.97 $A_w$). The coated sugar wafer was placed in the container between the upper and lower compartments resting on internal shoulder. The perimeter of the disc, between the disc edge and the compartment sidewall was filled using a commercial milk chocolate that had been softened with heating so as to secure the disc within the container. 18 grams of granola (0.28 $A_w$) was then placed into the upper compartment. The container was then sealed and refrigerated at 36° F. (2° C.). The shelf-life of this product has been determined to be about 4–5 weeks at refrigerated conditions.

| Sugar Wafer Formulation | |
|---|---|
| 20.90% | oat flour |
| 9.00 | flour (all purpose) |
| 53.42 | water |
| 9.00 | sugar |
| 3.70 | hydrogenated vegetable oil |
| 2.50 | potato starch |
| 0.70 | sodium bicarbonate |
| 0.62 | soya flour |
| 0.13 | salt |
| 0.03 | vanilla |
| 100.00% | |

EXAMPLE 3A

A more preferred version of the article described in Example 3 is fabricated with the following modifications. In addition to the glaze coating, a chocolate compound coating as described below of increased moisture resistivity is coated on the smooth wafer side about 1.0 mm in thickness. Upon cooling, this composite wafer is placed in the container as described in Example 3 with the chocolate coating facing the lower compartment. The perimeter seal is also comprised of this increased moisture resistant coating. At refrigerated temperatures (36° F., 2° C.) the shelf-life of this version is approximately 9–10 weeks.

| Chocolate Compound Coating | |
|---|---|
| 44.5% | acetylated monoglycerides |
| 14.8 | coconut oil (fully hydrogenated) |
| 25.6 | sucrose |
| 12.9 | natural-cocoa powder |
| 1.7 | non-fat dry milk |
| 0.5 | lecithin |
| 100.0% | |

EXAMPLE 4

A 500 gram batch of cookie dough was prepared using the formulation as described below. The sheeted thickness was 3.0 mm (0.118 inches). Cookies, 70 mm (2.76 in.) diameter were cut from the sheet before baking and engraved with a pattern condusive to produce controlled fractures of the cookie. Upon baking for the desired time, the cookies were cooled to about 100°–120° F. and coated on the smooth surface with a modified confectionery glaze as described below to a 1% by weight level and air dried. A compound chocolate coating as described in Example 3A was then enrobed on the smooth surface side of the cookie and cooled in the appropriate manner.

A cup corresponding in shape substantially to the container depicted in FIG. 1, but not having a microwave shield, was taken and in its lower compartment placed 6.0 ounces (170 grams) of Yoplait ® Lemon Yogurt (0.97 $A_w$). The composite cookie was placed in the container between the upper and lower compartments seating on the internal shoulder with the compound coating facing the lower compartment or higher moisture food. The perimeter of the disc was treated as previously mentioned in Example 3 using the chocolate compound coating that was employed on the enrobed cookie surface so as to secure the barrier into the container. 15 grams of small vanilla wafers were then placed into the upper compartment. The container was then sealed and refrigerated at 36° F. (2° C.). After ten weeks, the wafers are still relatively crisp. However, yogurt usually has a shelf life of about 35–50 days. Accordingly, the present article effectively separates the two food phases even longer than the ordinary shelf life of a typical component not having an added bacteriacide.

| Cookie Formulation | |
|---|---|
| 43.10% | sugar |
| 29.80 | enriched flour |
| 16.60 | hydrogenated vegetable oil |
| 6.15 | vegetable shortening powder w/corn syrup solids and sodium caseinate |
| 1.70 | soy flour |
| 0.85 | dry egg yolk |
| 0.80 | dry egg white |
| 0.60 | salt |
| 0.40 | vanilla powder |
| 100.00% | |

Preparation of Modified Confectionery Glaze 100 grams of dewaxed, carbon filtered shellac was placed in an oil jacketed heating vessel along with 20 grams hydroxypropyl cellulose (m.w. 100,000) and heated to 135° C. Upon reaching temperature, the reaction was run for eight minutes with stirring. The magma or molten mixture was stiff with a final temperature of 143°–148° C. The molten mixture or magma was poured into 900 ml of a 10:1 mixture of 95% ethanol and ethyl acetate with high shear mixing and upon solution, diluted to one liter.

EXAMPLE 5

A 500 gram batch of cookie dough was prepared using the formulation as described below. The sheeted thickness was 3.0 mm (0.118 inches). Cookies, 70 mm (2.76 inches) diameter were cut from the sheet before baking and engraved with a pattern required to produce a controlled fracture of the cookie. Upon baking for the desired time, the cookies were cooled to about 100°–120° F. and coated on the smooth surface with a modified confectionery glaze as described below to a 1% level by weight and dried under a steady stream of cool air.

A compound coating (1.0 mm thickness) as described below was then enrobed on the smooth surface side of the cookie and cooled in the appropriate manner. A cup corresponding in shape substantially to the container depicted in FIG. 1, but not having a microwave shield, was taken and in its lower compartment placed 6.0 ounces (170 grams) of Yoplait ® Lemon Yogurt (0.97 $A_w$). The composite cookie was placed in the container between the upper and lower compartments seating on the internal shoulder with the compound coating facing the lower compartment or higher moisture side. The perimeter of the disc, between the disc edge and the compartment side wall was filled with the compound chocolate coating that was employed on the enrobed cookie surface. 15 grams of small vanilla wafers were then placed into the upper compartment. The container was then sealed and refrigerated at 36° F. (2° C.). Shelf-life of the product is in excess of 10 weeks, although yogurt usually has a shelf-life of about 40 days.

| Cookie Formulation | |
|---|---|
| 20.26% | sugar |
| 0.41 | salt |
| 9.82 | hydrogenated vegetable oil |
| 0.30 | lecithin |
| 10.60 | water |
| 1.01 | vanilla |
| 0.51 | sodium bicarbonate |
| 0.30 | mono calcium phosphate |
| 0.30 | ammonium carbonate |
| 56.40 | flour |
| 100.00% | |

| Chocolate Compound Coating | |
|---|---|
| 44.5% | refined palm kernel oil |
| 14.8 | acetylated monoglycerides |
| 22.6 | sucrose |
| 12.9 | natural cocoa powder |
| 1.7 | non-fat dry milk |
| 3.0 | starch |
| 0.5 | lecithin |
| 100.0% | |

Preparation of Modified Confectionery Glaze 100 grams of dewaxed, carbon filtered shellac were placed into an oil jacketed heating vessel along with 10 grams of hydroxypropyl methylcellulose, 5 grams of stearic acid and 0.1 grams of a concentrated tannic acid solution (8 grams in 80 ml 95% ethanol) and heated to 135° C. Upon reaching temperature the reaction was run for several minutes with stirring. The magma or molten mixture was poured into 900 ml of a 10:1 mixture of 95% ethanol and ethyl acetate with high shear mixing and upon solution was diluted to one liter.

EXAMPLE 6

A sugar wafer formulation was prepared as outlined in Example 3. The cut wafer discs (69 mm, 2.72 inches diameter) were coated on both surfaces with a solution of modified confectioners glaze prepared as follows.

Ten grams of hydroxypropyl cellulose (m.w. 100,000) and 10 grams of dewaxed, carbon filtered shellac were dissolved in 100 ml 95% ethanol and warmed to 125° F. to effect solution with stirring. Upon solution, 5 ml of a concentrated citric acid solution (35 g in 80 ml 95% ethanol) was added. The solution was then coated on the wafer using an airless sprayer equipped with a 0.4 mm nozzle orifice. The coated wafer was heat cured at 300° F. (150° C.) for 7 minutes. The wafers were then removed from the oven and cooled to ambient (70° F., 22° C.) conditions. Final coating weight was 1.5%.

Subsequent use of the coated sugar wafers was as detailed in Examples 3 and 3A.

EXAMPLE 7

A 500 gram batch of cookie dough was prepared as outlined in Example 4. The cookies upon cooling were coated on the smooth surface side with a solution of modified confectioners glaze prepared as follows.

Ten grams of hydroxypropyl cellulose (m.w. 100,000) and 10 grams of dewaxed, carbon filtered shellac were dissolved in 100 ml 95% ethanol and warmed to 125° F. to effect solution with stirring. Upon solution, 5 ml of a concentrated citric acid solution (35 g in 80 ml 95% ethanol) was added. The solution was then coated on the smooth cookie surface using an airless sprayer with a 0.4 mm orifice nozzle. The coated cookies were heat cured at 300° F. (150° C.) for 10 minutes. The cookies were then cooled to ambient conditions (70° F., 22° C.). Final coating weight was 0.8%. Subsequent use of the coated cookies was as detailed in Example 4.

EXAMPLE 8

200 grams of a mass of dark chocolate of current commercial grade (Blommer Dark Alamo, Blommer Chocolate Company, Inc.) was taken and cast into a thin sheet 2.5 mm (0.10 inches) in thickness. Upon tempering and cooling at the conventional conditions, 70 mm (2.75 inches) diameter discs were punch cut from the sheet and engraved with a pattern on one surface to aid in a controlled breakage. The chocolate discs were then coated on the smooth surface side using a modified confectionery glaze prepared as described below.

100 grams of dewaxed, carbon filtered shellac and 25.8 grams of cranberry concentrate were placed in an oil jacketed heating vessel and heated to 138° C. Upon reaching temperature the magma or molten mixture began to foam and the reaction was run for 9 minutes with stirring. The magma was soft and fluid with a final temperature of 146° C. The molten mixture was poured into 900 ml of a 10:1 mixture of 95% ethanol and ethylacetate with high shear mixing and upon solution was diluted to one liter. The resulting solution was sprayed on the chocolate disc using an airless sprayer with a 0.4 mm nozzle orifice and dried under a steady stream of air, final coating weight was 0.85%.

In addition to the glaze coating, a compound coating as described in Example 3A was coated on the smooth chocolate disc side on top of the confectionery glaze to about 1.0 mm in thickness using standard enrobing techniques and allowed to cool to ambient conditions (70° F., 22° C.).

A cup corresponding in shape substantially to the cup depicted in FIG. 1, but not having a microwave shield, was taken and in its lower compartment placed 6.0 ounces (170 grams) of Yoplait ® Cherry Yogurt. The laminated chocolate disc was then placed in the container between the upper and lower compartments resting on the internal ledge with the compound coating face (smooth surface) facing the lower compartment or higher moisture side. The perimeter of the disc, between the disc edge and the compartment side wall was filled using the identical compound chocolate coating as was used for the enrobing. 1 oz. (28.4 grams) of commercially available 10,000 count chocolate chips was then placed into the upper compartment, the container sealed and refrigerated at 36° F. (2° C.). The shelf-life of this product is in excess of 8 weeks at refrigerated conditions.

EXAMPLE 8A

Articles of the present invention of substantially equivalent properties can be prepared similar to Example 8 except that the chocolate is a milk chocolate formulation for the disc.

EXAMPLE 8B

Articles of the present invention of substantially equivalent properties can be prepared similar to those described in Example 8 except that the chocolate disc is a compounded peanut butter formulation (Blommer Chocolate Company, Inc.) and the Yoplait ® Yogurt is a vanilla flavor.

EXAMPLE 8C

Articles of the present invention of substantially equivalent properties can be prepared similar to those described in Example 8 except that the chocolate disc is a compounded peanut butter formulation as in Example 8B; the yogurt, a chocolate flavored yogurt and the chocolate chips are peanut butter chips.

EXAMPLE 8D

Articles of the present invention of substantially equivalent properties can be prepared similar to those described in Examples 8, 8A and 8B except that the upper compartment is filled with 0.75 oz. (21.3 grams) of granola.

EXAMPLE 9

Several commercially available Hydrox ® brand cookies 75 mm (3.0 inches) in diameter (available from Sunshine Biscuits, Inc.) were taken and scored with a pattern necessary to produce a controlled fracture of the cookies. The smooth side of the cookies were coated with a confectionery glaze prepared as follows:

100 grams of dewaxed, carbon filtered shellac and 3.7 grams of anisaldehyde were placed in an oil jacketed heating vessel and heated to 135° C. Upon reaching temperature, the magma or molten mixture began to foam and the reaction was run for nine minutes with stirring. The magma was soft and fluid with a final temperature of 148° C. The molten mixture was poured into 900 ml of a 10:1 mixture of 95% ethanol and ethylacetate with high shear mixing and upon solution was diluted to one liter. The resulting solution was sprayed on the cookies using an airless sprayer. Average coating weight was 0.75%. An additional compound coating as described in Example 3A was coated on the smooth cookie side, on top of the confectionery glaze to about 1.0 mm in thickness using standard enrobing techniques and cooled to ambient conditions (70° F., 22° C.).

A cup corresponding in shape substantially to the cup depicted in FIG. 1, but not having a microwave shield, was taken and in its lower compartment placed 6.0 ounces (170 grams) of Yoplait ® Vanilla Yogurt. The laminated chocolate disc was then placed in the container between the upper and lower compartments resting on the shoulder ledge with the compound coating face (smooth surface) facing the lower compartment or higher moisture side. The perimeter of the disc, between the disc edge and the compartment side wall was filled using the identical compound chocolate coating as was used for the enrobing.

20 grams (0.70 ounces) of sectioned OREO ® brand cookies were placed into the upper compartment, the container sealed and refrigerated at 36° F. (2° C.). The shelf-life of this product is in excess of 10 weeks at refrigerated conditions.

EXAMPLE 10

70 mm (2.75 inches) discs each weighing 10 grams were prepared by casting using a white compound fat system. The white compound fat system formulation is as follows:

| | |
|---|---|
| 49.92% | sugar |
| 16.58 | refined palm kernel oil |
| 9.92 | acetylated monoglycerides |
| 5.33 | coconut oil |
| 9.92 | corn oil |
| 8.00 | non-fat dry milk |
| 0.33 | lecithin |
| 100.00% | |

A cup corresponding in shape substantially to the cup depicted in FIG. 1, but not having a microwave shield, was taken and in its lower compartment placed a pre-baked microwave muffin (40 g). The white compounded disc was then placed in the container between the upper and lower compartments resting on the internal shoulder. The upper compartment was then filled with a commercial fruit sauce preparation ($A_w$ 0.92) (35 g) and immediately frozen in a −40° F. blast freezer for several hours. The samples were removed from the blast freezer and equilibrated for 48 hours in a standard freezer at 0° F. (−18° C.). The samples were removed from the freezer and placed in a 450 watt microwave oven and heated on high for 35 seconds, whereupon the compound fat disc melted and the warm fruit sauce in the upper compartment collapsed over the warm muffin in the lower compartment thereby producing a microwave heated fruit and muffin with glaze.

EXAMPLE 10A

An article similar to that prepared in Example 10 is prepared but with the following modifications: Into the lower compartment is placed the commercial fruit sauce. The compounded disc is placed between the upper and lower compartments resting on the internal shoulder. The upper compartment is then filled with the muffin (pre-baked). The product is then heated as described in Example 10 and upon removing from the microwave and removal of the top cover, the article is inverted on a plate, thereby having the warm muffin topped with the icing glaze and surrounded with a warm fruit sauce.

EXAMPLE 10B

Articles of the present invention of substantially equivalent properties can be prepared similar to those described in Examples 10 and 10A, but with the following cream cheese compound formulation used for the meltable disc or barrier.

| | |
|---|---|
| 32.41% | Borden (#1363) Cream Cheese Powder |
| 23.15 | partially hydrogenated vegetable oil |
| 9.26 | acetylated monoglycerides |
| 9.26 | tapioca starch |
| 5.55 | maltodextrins |
| 5.55 | Therm-Tex ® pregelatinized starch (National Starch Co.) |
| 4.64 | refined palm kernel oil |
| 4.63 | lactose |
| 1.85 | non-fat dry milk |
| 1.67 | cream cheese flavor emulsion |
| | (Edlong Corp. #1134) |
| 1.15 | coconut oil |
| 0.51 | artificial cream cheese emulsion (Virginia Dare #400) |
| 0.37 | hydroxylated lecithin |
| 100.00% | |

Upon heating as described in Example 10, finished product is a warm muffin with cream cheese glaze and fruit.

EXAMPLE 10C

Another preferred version of the articles of Examples 10, 10A and 10B is to have the surface (preferably one side) of the compounded disc coated with a glaze as described in Examples 1–9 inclusive. The glaze coating upon assembly of the barrier in the container is preferably facing the fruit sauce or other highly colored media, so as to prevent discoloration of the white disc during subsequent temperature cycling and to maintain the meltable barrier integrity.

EXAMPLE 11

100 grams of a granular mix was prepared from the following formulation and sieved to a uniform size. 15 grams of mix comprising:

| | |
|---|---|
| 60 g | Cinnamon Toast Crunch ® RTE cereal |
| 34 g | DiPac ® tableting sugar |
| 6 g | Klucel[1.]/acetylated monoglyceride/ calcium stearate (ratio 5:2.5:2.5) |
| 1 | Klucel ® branch hydroxypropyl cellulose marketed by Hercules, Inc., Wilmington, Delaware | was then placed in a 75 mm (3 inch) diameter die that was preheated to 200° F. The mixture was compressed into a cereal tablet using 10,000–30,000 PSI (0.70–2.11×$10^3$ kg/$cm^2$) pressure with a tableting die having an embossed die face which was used to prepare disc barriers with score lines to aid in a controlled fracture of the cereal disc. The smooth cereal disc surface was then coated with a modified confectionery glaze as described in Example 2 to about a 1% by weight level and dried under turbulent cool air flow. A compound coating similar to the one described in Example 3A but with the following formulation was enrobed on the smooth cereal disc surface and cooled in a conventional manner.

| Vanilla Compound Coating Formulation | |
|---|---|
| 45.6% | sugar |
| 18.2 | coconut oil |
| 18.2 | refined palm kernel oil |
| 16.0 | milk solids (non-fat dry milk) |
| 2.5 | refined cocoa butter (prime pressing) |
| 0.5 | lecithin |
| 100.00% | |

A cup corresponding in shape substantially to the container depicted in FIG. 1, but not having a microwave shield, was taken and in its lower compartment placed 5.0 ounces (142 grams) of Yoplait ® Vanilla Yogurt (0.97 $A_w$). The composite cereal disc prepared as described above was placed in the container between the upper and lower compartments seating on the internal shoulder with the compound coating side facing the lower compartment or high moisture material. The periphery of the disc was treated as previously described in Example 3 so as to secure the disc in the container using the compound coating that was employed on the enrobed cereal disc surface. 10 grams of Cinnamon Toast Crunch ® ready-to-eat cereal was then placed into the upper compartment. The container was then sealed and refrigerated at 36° F. (2° C.). Shelf-life of the product is in excess of 10 weeks, although yogurt usually has a shelf-life of about 40 days.

EXAMPLE 11A

Articles of the present invention of substantially equivalent properties were fabricated similar to Example 11, except that granola was used instead of Cinnamon Toast Crunch cereal in both the cereal disc and in the container upper compartment while the yogurt was raspberry flavor.

EXAMPLE 11B

Articles of the present invention of substantially equivalent properties were fabricated similar to those described in Example 11, except the cereal disc was the following composition.

| | |
|---|---|
| 50.0% | Wheaties ® toasted wheat flakes |
| 28.3 | DiPac ® tableting sugar |
| 12.5 | partially hydrogenated vegetable oil |
| 4.2 | coconut oil |
| 2.5 | hydroxypropyl cellulose (KLUCEL ®) |
| 2.5 | acetylated monoglycerides |
| 100.0% | |

The Yoplait ® yogurt was orange flavor and wheat flakes (15 grams) were also placed in the container's upper compartment.

EXAMPLE 11C

Articles of the present invention of substantially equivalent properties were fabricated similar to those described in Example 11B, except that the cereal disc was made using Fiber One ™ cereal, the yogurt was Pina Colada in flavor and the upper compartment was filled with 17 grams of a quality trail-mix (nuts, raisins, dried bananas, dried fruit, etc.).

EXAMPLE 12

15 grams of mixed nut meat pieces (pecan, walnut, almond) were taken and placed in a 75 mm (3 inch diameter) die that was preheated to 200° F. The nut meats were then compressed into a disc with slight surface concavities at a pressure of 10,000–30,000 PSI (0.70–2.11×10³ kg/cm²). Upon equilibrating to ambient conditions, a compound coating composition as described below was coated on one surface,

| Compound Coating Composition | |
|---|---|
| 10.7% | acetylated monoglycerides |
| 10.6 | coconut oil |
| 7.4 | refined palm kernel oil |
| 7.0 | partially hydrogenated vegetable oil |
| 37.5 | sugar |
| 25.8 | non-fat dry milk |
| 0.5 | lecithin |
| 0.5 | flavoring |
| 100.00% | | and cooled to room temperature.

Into the lower compartment of a cup corresponding in shape substantially to the container depicted in FIG. 1, but not having a microwave shield, was placed a stack of "Silver Dollar" i.e., 2½ inches in diameter pancakes. The composite compressed nut disc was then placed into the container between the upper and lower compartments seating on the internal shoulder with the compound coated surface facing the lower compartment or higher moisture food component. The upper compartment was then filled with a two oz. (57 g) serving size of a commercial maple syrup preparation and immediately frozen in a blast freezer for several hours. The frozen food article was removed from the blast freezer and equilibrated for 48 hours in a standard freezer at 0° F. (−18° C.). The samples were then placed in a 500 watt microwave oven and heated on full power for 45 seconds, whereupon the compressed nut disc separated and the warm maple syrup in the upper compartment collapsed over the pancakes in the lower compartment.

EXAMPLE 12A

An article substantially equivalent to that described in Example 12 can be prepared except that the compression nut disc is made with the following composition:

| | |
|---|---|
| 60% | nut meats |
| 40% | DiPac ® tableting sugar |

Also, the compression nut disc is coated on both sides with the compound coating as described in Example 12. Optional coatings also include the confectionery glaze as described in Example 2.

EXAMPLE 12B

An article substantially equivalent to that described in Examples 12 and 12A can be prepared except that french toast sticks or french toast is used in place of the pancakes.

EXAMPLE 12C

An article substantially equivalent to that described in Examples 12 and 12A can be prepared except that waffles are used in place of the pancakes.

EXAMPLE 12D

Articles substantially equivalent to that described in Examples 12, 12A, 12B and 12C can be prepared except that the syrup is placed in the lower compartment and the pancakes, waffles or french toast are in the upper compartment. Also, a butter flavored meltable disc is substituted for the compression nut disc.

EXAMPLE 12E

An article substantially equivalent to that described in Examples 12, 12A, 12B, 12C and 12D can be prepared except that the syrup is replaced with a fruit sauce or compote. Also, a cream cheese flavored meltable disc is substituted for the compression nut disc as described in Example 10B and is assembled as detailed in Example 10C.

EXAMPLE 13

A compressed nut disc similar to that as described in Example 12 was prepared and coated on one surface with a compound coating as detailed in Example 12 and cooled in a conventional manner.

A cup corresponding in shape substantially to the container depicted in FIG. 1, but not having a microwave shield, was taken and in its lower compartment placed about ⅔ cup of water and 30 grams (1.1 oz.) of diced frozen peaches. The composite compressed nut disc was then placed into the container between the upper and lower compartments resting on the internal shoulder with the compound coated surface side facing the lower compartment or higher moisture food component. The perimeter of the disc, between the disc edge and the container inner side wall was sealed with an additional 2 grams of formulated compound coating that was employed on the enrobed surface. One ounce (28 grams) of Quaker® instant oatmeal was then placed into the upper compartment, the container sealed and immediately frozen in a blast freezer (−40° F.) for several hours. The frozen article was then removed from the blast freezer and equilibrated for 48 hours in a standard freezer at 0° F. (−18° C.). The sample was then placed in a 750 watt microwave oven with a rotating carousel and heated on high for three minutes. The product was removed from the microwave, stirred and placed back in the microwave oven and heated on high for another minute. Upon removing from the microwave oven an instant microwave breakfast of hot oatmeal, nuts and fruit was ready to serve.

EXAMPLE 13A

An article of substantially equivalent properties to the article described in Example 13 can be prepared differing in that a meltable barrier disc is employed in place of the compression nut disc.

EXAMPLE 14

100 grams of a granular mix was prepared from the following formulation.

| | | |
|---|---|---|
| 55.0% | graham cracker | |
| 30.0 | DiPac ® tableting sugar | |
| 10.0 | coconut oil | |
| 2.5 | hydroxypropyl cellulose | |
| 2.5 | acetylated monoglycerides | |
| 100.0% | | |

1. DiPac brand sugar marketed by Amstar Corp., New York, NY.

15 grams of mix was then placed in a 75 mm (3 inch) diameter die that was preheated to 200° F. The mixture was compressed into a tablet shape using 10,000–30,000 PSI ($0.70$–$2.11 \times 10^3$ kg/cm²) pressure with an embossed die face yielding a disc with score lines on one face. The smooth surface of the disc was then coated with a confectionery glaze as described in Example 2 to about a 1% by weight level and dried under a turbulent cool air flow. A compound coating substantially identical to the one described in Example 11 was enrobed on the smooth disc surface and cooled in a conventional manner.

Into the lower compartment of a cup corresponding in shape substantially to the container depicted in FIG. 1, but not having a microwave shield, was placed 5.0 ounces (142 grams) of tapioca pudding (0.97 $A_w$). The composite cracker disc was placed in the container between the upper and lower compartments seating on the internal ledge with the compound coating side facing the lower compartment or higher moisture material. The perimeter of the disc was treated as previously described in Example 3. 30 grams (1.1 ounces) of blueberry sauce (0.92 $A_w$) was then placed into the upper compartment. The container was then sealed and stored at 36° F. (2° C.).

EXAMPLE 14A

A more preferred variation of the article described in Example 14 has the following improvements. The confectioners glaze is applied to both surfaces of the cracker to about a 2% level by weight. Secondly, the compound coating enrobing is applied to both surfaces of the cracker. Shelf-life of this product is in excess of 8 weeks at 36° F. (2° C.).

EXAMPLE 14B

An article substantially equivalent to those described in Example 14 and 14A can be prepared except that the graham cracker is baked rather than being compressed.

EXAMPLE 15

To illustrate the importance of having the combination of the present barrier and an air space intermediate the lower food portion, an article not of the present invention comprising a cup corresponding in shape substantially to the container depicted in FIG. 1 was taken including the microwave shield and in its lower compartment placed 114 grams (4.0 ounces) of commercial quality ice cream (12% milk fat, 11% serum solids, 15% sugar and 0.3% stabilizer; total solids 38.3%). The upper compartment was filled with 30 grams (1.1 ounces) of hot fudge topping (commercial preparation) resting directly on the ice cream. Thus, the test article did not have either the air space or intermediate edible barrier. The article was immediately frozen in a blast freezer at −40° F. for several hours, removed and equilibrated in a standard freezer (0° F., −18° C.) for 48 hours. The sample was then removed from the freezer and placed in a 750 watt microwave oven with a rotating carousel. After microwaving for 45 seconds on high and removal from the microwave oven, the fudge topping was undesirably only partially melted. There were warm areas and several large cold/frozen areas of fudge, namely towards the center of the container. The warm fudge was not flowable. Further, the ice cream was undesirably already partially softened and melted.

EXAMPLE 16

To illustrate further the importance of the several elements of the present invention used in combination, an article similar in composition to that prepared in Example 15 was prepared but which differed in that the microwave shield did not completely shield the lower food phase. The upper compartment was filled with 30 grams (1.1 ounces) of hot fudge topping (commercial preparation) resting directly on the ice cream, with the microwave shielding ¼ inch below fudge topping-ice cream interface.

After microwaving for 45 seconds on high and removing from the microwave oven, the fudge was undesirably only partially melted and flowable while the top exposed portion of ice cream was undesirably completely melted with total softening of the remaining ice cream. The product configuration did not produce the desired result of hot fudge on cold ice cream and tends toward excessive melting of the ice cream.

EXAMPLE 17

To illustrate the importance of the air space intermediate the barrier and the lower food phase, an article was prepared but not having the air space. 70 mm (2.75 inches) discs each weighting 10 grams were prepared by casting using a chocolate compound fat system as described below.

| | |
|---|---|
| 34.41% | sugar |
| 23.66 | refined palm kernel oil |
| 14.25 | acetylated monoglycerides |
| 14.25 | corn oil |
| 7.58 | coconut oil |
| 4.16 | cocoa (natural and dutched) |
| 1.41 | non-fat dry milk |
| 0.25 | lecithin |
| 100.00% | |

A cup corresponding in shape as described in Example 15 and with similar ingredient composition was taken and in its lower compartment placed 114 grams (4.0 ounces) of a commercial quality ice cream (12% milk fat). The prepared 70 mm (2.75 inch) disc as described above was then placed directly on the ice cream and 30 g (1.1 ounces) of hot fudge topping was placed directly on top of the chocolate formulated disc. The article assembly was fabricated with no air space between the ice cream top surface and the chocolate disc bottom surface. Also, the microwave shielding height was to the topping/barrier-ice cream interface.

After microwaving and removal from the microwave oven as described in Example 15, the fudge sauce was fluid, but not of sufficient temperature to have melted the edible chocolate barrier. The ice cream was undesirably soft with some melting and the chocolate barrier disc was undesirably still hard and intact. Subsequent standing to equilibrate product resulted in ice cream melting and fudge sauce solidifying with the barrier still unmelted. The ice cream lower food phase acted as a heat sink and prevented the melting of the barrier.

EXAMPLE 18

An article substantially similar to that described in Example 17 but having the important intermediate air space and thus an article of the present invention was prepared similar to Example 17 in ingredient composition but with the following differences.

A cup corresponding in shape substantially to the container depicted in FIG. 1 including having a microwave shield was taken and in its lower compartment placed 114 grams (4.0 ounces) of a commercial quality ice cream (12% milk fat). A prepared 70 mm (2.75 inch) disc as described in Example 17 was taken and placed in the container between the upper and lower compartments resting on the internal ledge. The bottom surface of the disc was approximately ⅛ inch above the top surface of the ice cream, thereby creating an insulation and air space between the meltable disc and the ice cream. The upper compartment was then filled with 30 grams (1.1 ounces) of a commercial hot fudge topping. The completed product was immediately frozen in a blast freezer ($-20°$ F.) for several hours, removed and equilibrated in a standard freezer ($0°$ F., $-18°$ C.) for 48 hours. The sample was then removed from the freezer and placed in a 750 watt microwave oven with a rotating carousel.

After microwaving for 45 seconds on full power and removing from the microwave, the fudge was desirably fluid, warm and at the correct viscosity. The barrier had melted and the fudge sauce had collapsed over the ice cream. The ice cream was desirably frozen, with minimal melting and the prepared end product desirably comprised a warm fudge over solid frozen ice cream.

EXAMPLE 18A

An article of the present invention of substantial equivalence in providing a substantially uniformly warmed first phase and a substantially uniform frozen second phase can be prepared when in the article of Example 18 the meltable disc is a light chocolate compounded fat system having the formulation given below and when the topping comprises a milk chocolate fudge topping.

| Light Chocolate Meltable Barrier | |
|---|---|
| 49.93% | sugar |
| 16.56 | fractionated palm kernel oil |
| 9.94 | corn oil |
| 9.94 | acetylated monoglycerides |
| 6.00 | cocoa-natural |
| 5.30 | coconut oil |
| 2.00 | non-fat dry milk |
| 0.33 | lecithin-hydroxylated |
| 100.00% | |

EXAMPLE 18B

An article of the present invention of substantial equivalence in providing a substantially uniformly warmed first phase and a substantially uniformly frozen second phase can be prepared when in the article of Example 18 the meltable disc is a caramel flavored compounded fat system having the formulation given below and when the topping comprises a caramel or butterscotch fudge topping.

| Caramel Meltable Barrier | |
|---|---|
| 49.0% | sugar |
| 16.5 | refined palm kernel oil |
| 10.0 | corn oil |
| 10.0 | acetylated monoglycerides |
| 5.2 | coconut oil |
| 5.0 | caramel-natural and artificial flavor |
| 4.0 | non-fat dry milk |
| 0.3 | hydroxylated lecithin |
| 100.0% | |

EXAMPLE 18C

An article of the present invention of substantial equivalence in providing a substantially uniformly warmed first phase and a substantially uniformly frozen second phase can be prepared when in the article of Example 18 the meltable barrier is a vanilla flavored compounded fat system having the formulation given below and when the topping comprises a vanilla fudge topping and the ice cream being a commercial grade (12% milk fat) of chocolate ice cream.

| Vanilla Compound Meltable Barrier | |
|---|---|
| 50.0% | sugar |
| 16.5 | fractionated palm kernel oil |
| 10.0 | corn oil |
| 10.0 | acetylated monoglycerides |
| 8.0 | non-fat dry milk |

-continued

| Vanilla Compound Meltable Barrier | |
|---|---|
| 5.2 | coconut oil |
| 0.3 | lecithin-hydroxylated |
| optional | flavoring |
| 100.0% | |

EXAMPLE 19

88 mm (3.46 inch) discs each weighing 20 g were prepared by casting using a chocolate compound fat system as described below.

| | |
|---|---|
| 44.00% | sugar |
| 16.56 | refined palm kernel oil |
| 11.93 | cocoa-dutched |
| 9.94 | corn oil |
| 9.94 | acetylated monoglycerides |
| 5.30 | coconut oil |
| 2.00 | non-fat dry milk |
| 0.33 | lecithin-hydroxylated |
| 100.00% | |

Into the lower compartment of a cup corresponding in shape substantially to the container depicted in FIG. 1 including a microwave shield was placed 170 g (6.0 ounces) of a commercial quality vanilla ice cream (12% milk fat). The disc prepared above was then placed in the container between the upper and lower compartment resting on the internal shoulder. The bottom surface of the disc was approximately ⅛ inch (3.0 mm) above the top surface of the ice cream, thereby creating an insulative air space between the meltable disc and the ice cream. The upper compartment was then filled in three sections. In the first section was placed 28 g (1.0 ounces) of a commercial hot fudge topping, into the second section was placed 28 grams (1.0 ounces) of a commercial caramel butterscotch fudge sauce and into the third section was placed 28 grams (1.0 ounces) of a marshmallow cream sauce. The completed product was immediately frozen in a blast freezer (−40° F.) for several hours, removed and equilibrated in a standard freezer (0° F., −18° C.) for 48 hours. The product was then removed from the freezer and placed in a 750 watt microwave oven. After microwaving on high (full power) for 50 seconds and removing from the microwave oven, the fudge sauces and the marshmallow cream sauce were warm (about 140° F.) and at the desired viscosity. The barrier disc had melted and the sauces had collapsed over the ice cream. The ice cream was desirably hard and still frozen with minimal melting. The resultant finished product was a desirable combination of cold, frozen ice cream topped with a warm multi-flavored topping.

EXAMPLE 19A

An article of the present invention substantially equivalent in providing a combination of different food products of different textures and temperatures were prepared when in the article of Example 19 a cherry sauce and nuts were added to the top of the sauces in the upper compartment and banana pieces were added to the ice cream in the lower compartment, thereby producing upon microwave heating a microwave banana split.

EXAMPLE 19B

An article of the present invention substantially equivalent in providing desired organoleptic attributes can be prepared when in the article of Example 19A a combination of chocolate, vanilla and strawberry ice creams are placed in the lower compartment.

EXAMPLE 19C

An article of the present invention substantially equivalent in providing desired organoleptic attributes can be prepared when in the article of Example 19, 19A and 19B a variegated flavor meltable disc is used; e.g., chocolate and caramel compound fat system or similar type variegates.

EXAMPLE 20

Several 70 mm (2.75 inch) discs each weighing 10 g were prepared by casting using a formulated savory compound fat system.

| | |
|---|---|
| 25.00% | maltodextrins |
| 23.60 | refined palm kernel oil |
| 14.20 | corn oil |
| 14.20 | acetylated monoglycerides |
| 13.00 | tapioca flour |
| 7.57 | coconut oil |
| 2.10 | non-fat dry milk |
| 0.34 | lecithin |
| as required | - flavoring |
| 100.00% | |

A cup corresponding in shape substantially to the container depicted in FIG. 1, but not having a microwave shield, was taken and in its lower compartment placed a pre-baked microwave corn muffin (40 g.). The savory compounded disc was then placed in the container between the upper and lower compartments resting on the internal shoulder. The upper compartment was then filled with 45 g (1.6 ounces) of a commercial shrimp creole preparation and immediately frozen in a blast freezer (−40° F.) for several hours. The samples were removed from the blast freezer and equilibrated for 48 hours in a standard freezer at 0° F. (−18° C.). The sample was removed from the freezer and placed in a 700 watt microwave oven and heated on full power for 60 seconds, whereupon the compound savory disc melted and the hot shrimp creole in the upper compartment collapsed over the warm corn muffin in the lower compartment thereby producing a hot mini-meal of shrimp creole and corn muffins.

EXAMPLE 20A

An article substantially equivalent to that described in Example 20 can be fabricated where into the lower compartment is placed the shrimp creole preparation and into the upper compartment placed the corn muffin with the meltable barrier separating the two compartments. The product is then heated as described in Example 20 and upon removing from the microwave oven is inverted on a plate or in a bowl, thereby having the hot corn muffin with the shrimp creole on top of and around the muffin. This execution being preferred if removal from the container is desired before consuming the mini-meal.

EXAMPLE 20B

Similar to Examples 20 and 20A except using oyster crackers or similar and stew (beef, poultry, etc.).

EXAMPLE 20C

Similar to Examples 20 and 20A except using pre-baked biscuits or similar and gravy or sauce as desired.

EXAMPLE 20D

Similar to Examples 20 and 20A except using the cheese barrier formulation of Example 2 and into one compartment placing chips (nachos, pretzels, extruded snacks) or partial puffed snacks and into the other compartment placing a cheese sauce (real cheese sauce or cheese flavored) thereby producing a microwave nacho and cheese type snack.

EXAMPLE 21

70 mm (2.75 inch) discs each weighing 10 g were prepared by casting using a formulated savory compound fat system as described below:

| | |
|---|---|
| 1029.4% | maltodextrins |
| 27.8 | refined palm kernel oil |
| 16.7 | corn oil |
| 16.7 | acetylated monoglycerides |
| 9.1 | coconut oil |
| 0.3 | lecithin |
| as required | - flavoring |
| 100.0% | |

A cup corresponding in shape substantially to the container depicted in FIG. 1, but not having a microwave shield, was taken and in its lower compartment placed 170 grams (6 ounces) of a commercial soup preparation. The savory compounded disc was then placed in the container between the upper and lower compartments resting on the internal ledge. The upper compartment was filled with 20 g (0.70 ounces) of commercial soup crackers and immediately frozen in a blast freezer for several hours. The sample was then removed from the blast freezer and equilibrated for 48 hours in a standard freezer for 72 hours at 0° F. (−18° C.). The sample was then removed from the freezer and placed in a 750 watt microwave oven and heated on high for three minutes, removed from the oven, stirred and heated for an additional 60 seconds. Upon removal from the microwave oven, hot soup and crackers were ready for consumption. Shelf-life of this product is in excess of 15 months at frozen (0° F., −18° C.) storage conditions.

EXAMPLE 21A

An article substantially equivalent to that described in Example 21 can be fabricated with the following modifications. A cup corresponding in shape substantially to the container depicted in FIG. 1, but with a microwave shield on the upper compartment portion of the container, was taken and in its lower compartment placed 6 ounces (170 grams) of a retail preparation of french onion soup. The savory compounded disc was then placed in the container between the upper and lower compartments resting on the internal ledge. On top of the disc was placed a circular slice of dark rye bread (70 mm diameter) that had been coated with a thin (0.25 mm) savory flavored coating as described in Example 20. The upper compartment was then filled with 56 g (2.0 ounces) of a mozzarella cheese and immediately frozen in a blast freezer for several hours. Upon equilibration to 0° F. (−18° C.) in a standard freezer, the sample was placed in a 750 watt microwave oven and heated on high for three minutes with the microwave shielded lid on the container. The article is then removed from the oven and the lid removed. The article is then further heated for an additional two minutes. Upon removal from the microwave oven, a hot french onion soup is ready for consumption.

EXAMPLE 22

A cup corresponding in shape substantially to the container depicted in FIG. 1 was taken and in its lower compartment placed 114 grams (4.0 ounces) of a commercial quality ice cream. A prepared 70 mm (2.75 inch) disc as described in Example 17 was taken and placed in the container between the upper and lower compartments resting on the internal shoulder. The bottom surface of the disc was approximately ⅛ inch above the top surface of the ice cream, thereby creating an insulative air space between the meltable disc and the ice cream. The upper compartment was then filled with a pre-baked brownie (commercial preparation). The product was immediately frozen in a blast freezer for several hours, removed and equilibrated in a standard freezer (0° F., −18° C.) for 48 hours. The sample was then removed from the freezer and placed in a 750 watt microwave oven and heated on high for 60 seconds. Upon removal from the microwave, the brownie was warm and the meltable disc had melted while the ice cream was still hard and solid with minimal melting. The product, a microwave brownie a'la mode can either be inverted on a plate or in a bowl or consumed as is in the container as desired.

EXAMPLE 22A

An article substantially equivalent to that described in Example 22 can be prepared except with the following addition. After the meltable barrier has been placed in the container between the upper and lower compartments, 10 grams of a commercial chocolate sauce is placed on top of the barrier and the microwave brownie is then placed into the upper compartment.

EXAMPLE 22B

An article substantially equivalent to that described in Example 22 can be prepared except with the following modifications. The meltable barrier disc is a vanilla or other flavored disc as described in Example 10 and into the upper compartment is placed a pre-baked fruit pie. Thereby producing a microwave pie a'la mode.

EXAMPLE 22C

An article substantially equivalent to that described in Example 22B was prepared except that a commercial fruit preparation was placed into the upper compartment and then topped with a standard crumb topping or pre-baked pastry shell. Upon microwaving as described in Example 22 a microwave fruit cobbler a'la mode is produced.

EXAMPLE 22D

An article substantially equivalent to that described in Example 22B can be prepared except that a commercially prepared spoonable frozen cheesecake is placed into the lower compartment and a commercial fruit preparation is placed into the upper compartment.

Upon microwaving as described in Example 22 a microwave fruit and cheesecake dessert is made.

What is claimed is:

1. A packaged food article for food having two dissimilar phases which exhibits greater storage stability due to reduced migration between the phases, comprising:
   A. a container having, vertically arranged, a first lower compartment and a second upper compartment;
   B. an interjacent edible barrier, said barrier spaced within the container defining the bottom of the upper compartment and the top of the lower compartment and having opposed upper and lower major surfaces and wherein the edible barrier is laminated and includes:
      1. an edible, smooth surfaced, planar substrate having an opposed pair of major surfaces thereby defining an upper major surface and a lower major surface;
      2. a first layer overlaying or underlying said substrate in the form of an edible, continuous, flexible, non-water swelling, low-water vapor permeable film and comprises a member selected from the group consisting of
         (a) a composition comprising the heat cured reaction polymer product of
            (1) unbleached, dewaxed, filtered, carbon black decolorized, virgin, edible shellac, and
            (2) a first reactant member selected from the group consisting of hydroxypropyl cellulose, hydroxypropyl methyl cellulose, and mixtures thereof,
            wherein the ratio of the reactant member and shellac ranges from 0.001 to 2:1,
            and wherein the product has an average molecular weight of at least 2,000, and
         (b) a composition comprising the heat cured reaction polymer product of unbleached, dewaxed, filtered, carbon black decolorized, virgin, edible shellac and wherein the product has an average molecular weight ranging from about 1,500 to 6,000, and
         (c) mixtures of composition (a) and composition (b);
   C. means for securably positioning the barrier within the container including an internal shoulder intermediate the upper and lower compartments;
   D. a first food phase having a first water activity in the lower compartment having a top surface;
   E. a second food phase having a second water activity differing from the first water activity in the upper compartment; and
   F. an insulative air space intermediate the lower major surface of the barrier and the top surface on the first food phase and wherein the first layer is intermediate the substrate and the food phase having the higher water activity.

2. The article of claim 1 wherein the first layer is on the major substrate surface intermediate the substrate and the first food phase and wherein the first food phase has a higher water activity than the second food phase.

3. The article of claim 2 wherein the substrate is selected from the group consisting of smooth surface cookies, baked sugar wafers, compressed cereal fines, cheese, compound fats and compressed nut bars.

4. The article of claim 3 wherein the barrier additionally comprises
   4. a second layer over or underlying the substrate in the form of an edible continuous flexible, non-water swelling low-water vapor permeable film and wherein the substrate is intermediate the first and second layers and
   wherein the second layer comprises a member selected from the group consisting of
      (a) a composition comprising the heat cured reaction polymer product of
         (1) unbleached, dewaxed, filtered, carbon black decolorized, virgin shellac,
         (2) a second reactant member selected from the group consisting of hydroxypropyl cellulose, hydroxypropyl methyl cellulose, and mixtures thereof,
         wherein the ratio of the reactant member and shellac ranges from 0.001 to 2:1, and
         wherein the product has an average molecular weight of at least 2,000,
      (b) a composition comprising the heat cured reaction polymer product of unbleached, dewaxed, filtered, carbon black decolorized, edible, virgin shellac wherein the product has an average molecular weight ranging from about 1,500 to 6,000, and
      (c) mixtures of composition (a) and composition (b).

5. The article of claim 4 wherein the means for securing the barrier within the container includes an inwardly projecting shoulder formed in the container at the upper end of the lower compartment.

6. The article of claim 5 wherein the container is fabricated from dielectric materials.

7. The article of claim 6 wherein the overlaying and underlying films each range from about 1 to 5 mils in thickness.

8. The article of claim 7 wherein the barrier additionally comprises
   5. a third layer comprising an edible fat intermediate the first lower food phase and the first layer.

9. The article of claim 8 wherein the package is cylindrical and wherein the shoulder is defined by the diameter of the upper compartment being greater than the diameter of the lower compartment thereby defining an upper body wall and a lower body wall.

10. The article of claim 9 wherein the insulative air space is at least 1 mm in thickness.

11. The article of claim 9 wherein the insulative air space is at least 3 mm in thickness and wherein the barrier includes
   6. means for fracturing into pieces of controlled shape or size.

12. The article of claim 11 wherein the means for securing the barrier further includes a peripheral fat ring surrounding the barrier on at least one major surface of the substrate.

13. The article of claim 12 wherein the third layer of fat ranges from about 0.25 to 10 mm in thickness.

14. The article of claim 13 wherein the composition (b) polymer product further includes an edible reactant member containing a hydroxyl or acid moiety reactive with shellac and wherein the weight ratio of said edible reactant member containing a hydroxyl or acid moiety to combined weight of shellac and first reactant member range from about 0.0001 to 0.25:1.

15. The article of claim 14 wherein the means for fracturing includes a plurality of score lines in at least one major surface of the substrate.

16. The article of claim 15 wherein the barrier is circular and the score lines include a plurality of radial score lines and at least one concentric ring score line.

17. The article of claim 16 wherein the means for fracturing further includes a plurality of score lines on each major surface of the substrate.

18. The article of claim 17 wherein the first food phase is selected from the group consisting of ready-to-eat cereal, cheese, pudding, yogurt, baked goods, soup, stew and chili.

19. The article of claim 18 wherein the second food is selected from the group consisting of marshmallows, croutons, granola, nuts, dried fruit pieces, puffed cereal grains, baked wafers, chocolate chips, crackers, fudge sauce, caramel sauce, fruit sauce, syrups, compounded chips and gravy.

20. The article of claim 9 additionally comprising a microwave shield attached to the container and surrounding the body wall of at least one compartment.

21. The article of claim 20 further including a microwave transparent lid removably attached to the upper compartment and wherein the container has a substantially flat bottom and wherein the microwave shield surrounds the body wall, extends from the shoulder downwardly and terminates proximate the bottom.

22. The article of claim 21 wherein the insulative air space is at least 3 mm in thickness and wherein the barrier includes 6. means for fracturing into pieces of controlled shape or size.

23. The article of claim 22 wherein the means for securing the barrier further includes a peripheral fat ring surrounding the barrier on at least one major surface of the substrate.

24. The article of claim 23 wherein the third layer of fat ranges from about 0.25 to 10 mm in thickness.

25. The article of claim 24 wherein the first food phase is selected from the group consisting of ready-to-eat cereal, cheese, pudding, yogurt, baked goods, soup, stew and chili.

26. The article of claim 25 wherein the second food is selected from the group consisting of marshmallows, croutons, granola, nuts, dried fruit pieces, puffed cereal grains, baked wafers, chocolate chips, crackers, fudge sauce, caramel sauce, fruit sauce, syrups, compounded chips and gravy.

27. The article of claim 24 wherein the first food phase is selected from the group consisting of ice cream, frozen yogurt, soft serve, cheesecake, soup, stew and baked goods and wherein the second food phase is selected from the group consisting of fudges, syrups, fruit sauces, dairy sauces, cheese, baked goods, meat, poultry and fish stews, sauces, gravies and mixtures thereof.

28. The article of claim 27 wherein the fat layer ranges in thickness from about 0.5 to 5 mm.

29. The article of claim 28 wherein the fat has a melting point ranging from 40° to 95° F.

* * * * *